United States Patent [19]

Hattori

[11] Patent Number: 4,904,229
[45] Date of Patent: Feb. 27, 1990

[54] BELT-AND-PULLEY TYPE CONTINUOUSLY VARIABLE TRANSMISSION AND METHOD FOR CONTROLLING THE SAME

[75] Inventor: Torao Hattori, Saitama, Japan

[73] Assignee: Honda Giken Kogyo Kabushiki Kaisha, Tokyo, Japan

[21] Appl. No.: 188,293

[22] Filed: Apr. 29, 1988

[30] Foreign Application Priority Data

Apr. 30, 1987 [JP] Japan .................................. 62-107019

[51] Int. Cl.$^4$ ............................................. F16H 11/02
[52] U.S. Cl. .......................................... 474/12; 74/867; 474/18; 474/28
[58] Field of Search .................... 474/11, 12, 17, 18, 474/28, 69, 70; 74/867–869

[56] References Cited

U.S. PATENT DOCUMENTS

| | | | |
|---|---|---|---|
| 3,600,961 | 8/1971 | Rattunde et al. | 74/867 |
| 4,519,790 | 5/1985 | Yamamuro et al. | 474/18 |
| 4,522,086 | 6/1985 | Haley | 474/18 X |
| 4,533,340 | 8/1985 | Abo et al. | 474/28 |
| 4,534,243 | 8/1985 | Yokoyama et al. | 474/28 X |
| 4,547,178 | 10/1985 | Hayakawa et al. | 74/867 X |
| 4,560,369 | 12/1985 | Hattori | 474/28 |
| 4,619,157 | 10/1986 | Sakai | 474/28 X |
| 4,673,379 | 6/1987 | Ohzono et al. | 474/28 |
| 4,716,791 | 1/1988 | Ohzono et al. | 74/867 |

FOREIGN PATENT DOCUMENTS

| | | |
|---|---|---|
| 55-65755 | 5/1980 | Japan . |
| 60-125450 | 7/1985 | Japan . |
| 60-136655 | 7/1985 | Japan . |
| 60-159456 | 8/1985 | Japan . |

Primary Examiner—Thuy M. Bui
Attorney, Agent, or Firm—Lyon & Lyon

[57] ABSTRACT

A control method controls a belt-and-pulley type continuously variable transmission having drive and driven pulleys mounted respectively on input and output shafts, a V-belt trained around the drive and driven pulleys, and an oil pressure source and an oil reservoir operatively coupled to first and second hydraulic pressure chambers for axially moving the movable conical members of the drive and driven pulleys to vary effective diameters of the drive and driven pulleys for thereby controlling a speed ratio. The movable conical members of the driver and driven pulleys are movable in synchronism with each other. The hydraulic pressure chamber of one of the driver and driven pulleys, the effective diameter of which is to become larger at that time, is first brought into communication with the oil pressure source. The hydraulic pressure chamber of the other of the drive and driven pulleys, the effective diameter of which is to become smaller at that time, is brought into communication with the oil reservoir, no earlier than the communication of the hydraulic pressure chamber of the one of the pulleys to the oil pressure source, for thereby starting to move the movable conical members.

6 Claims, 5 Drawing Sheets

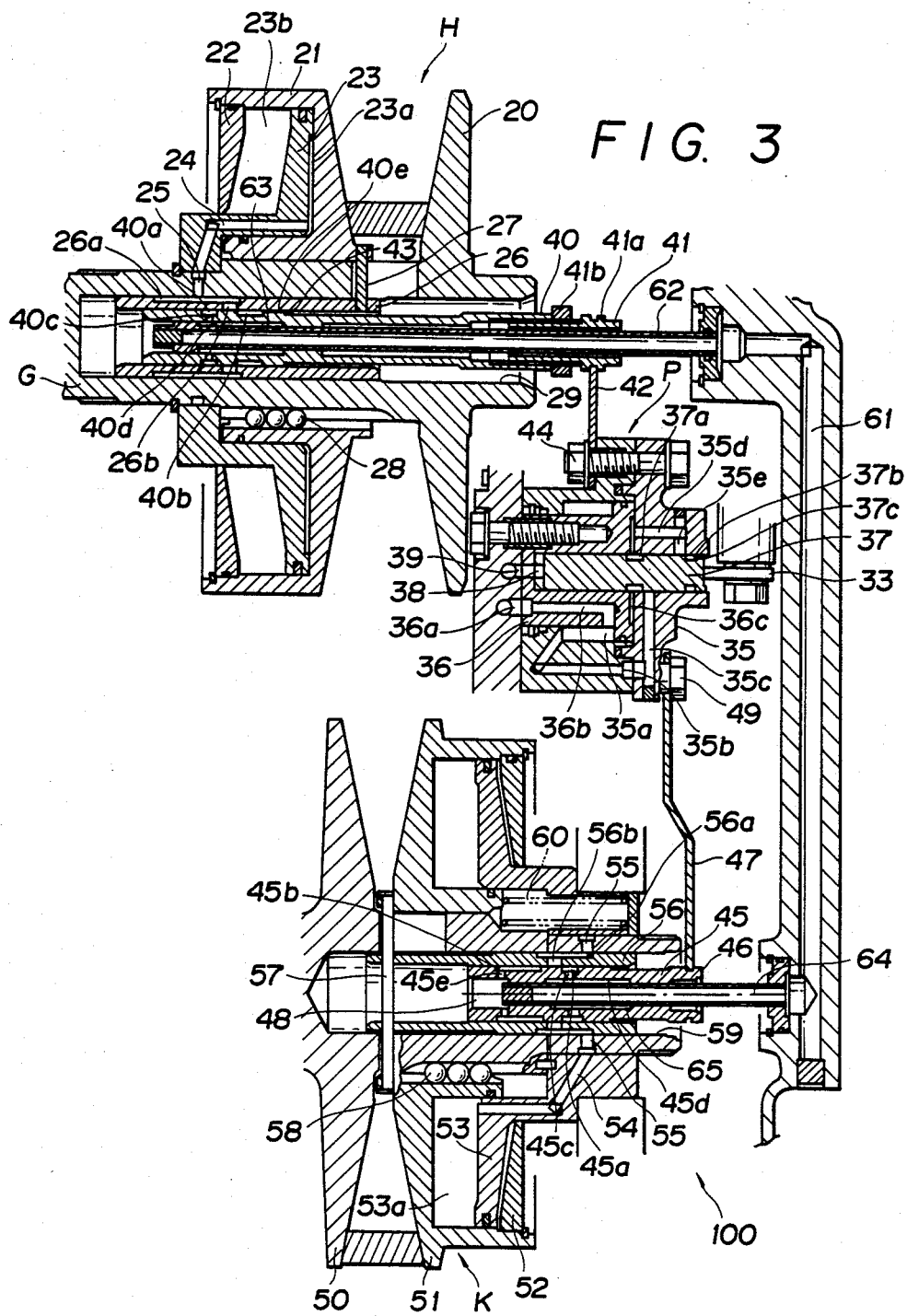

BELT-AND-PULLEY TYPE CONTINUOUSLY VARIABLE TRANSMISSION AND METHOD FOR CONTROLLING THE SAME

BACKGROUND OF THE INVENTION

1. Field of the Invention

The present invention relates to a belt-and-pulley type continuously variable speed, and more particularly to a belt-and-pulley type continuously variable transmission having a drive pulley on an input shaft, a driven pulley on an output shaft, each of the drive and driven pulleys comprising stationary and movable conical members, and a V-belt trained around the drive and driven pulleys, the movable conical members of the drive and driven pulleys being operated by a servo hydraulic actuator for controlling the effective diameters of the pulleys thereby to continuously vary the transmission ratio between the input and output shafts, i.e., the drive and driven pulleys.

2. Description of the Relevant Art

The aforementioned transmissions for use on motor vehicles are required to transmit the torque effectively by tensioning a V-belt trained around drive and driven pulleys to a degree proportional to the torque to be transmitted as by applying side force to the V-belt. The V-belt should remain tensioned while the effective diameters of the drive and driven pulleys are to be varied in order to vary the speed ratio.

Japanese Laid-Open Patent Publications Nos. 55-65755 (published May 17, 1980) and 60-125450 published July 4, 1985) disclose the aforementioned types of V-belt-and-pulley-type continuously variable transmissions in which the oil pressure from a pump is regulated according to the rotational speed of a driver pulley (i.e., the rotational speed of an engine) and a speed ratio, and the regulated oil pressure is supplied through a slide valve to a servo hydraulic pressure chamber for axially moving a movable conical member of the drive pulley so that the effective diameter of the driver pulley can be controlled while keeping a side force imposed on the V-belt. The slide valve is controlled by the rotational speed of the drive pulley and the opening of a throttle valve.

In the aforementioned transmissions, however, the effective area in the servo hydraulic pressure chamber for actuating the movable conical member of a driven pulley is smaller than that in the servo hydraulic pressure chamber for actuating the movable conical member of the drive pulley, and the hydraulic pressure chamber associated with the driven pulley is always supplied with regulated oil pressure. In order to slide the movable conical member of the drive pulley in the direction of a smaller speed ratio, the effective diameter of the drive pulley is increased so that the tension of the V-belt is increased to move the movable conical member of the driven pulley against the side force thereon for thereby reducing the effective diameter of the driven pulley. Therefore, the load on the V-belt is increased, affecting the durability of the V-belt. Conversely, in order to slide the movable conical member of the drive pulley in the direction of a larger speed ratio, the oil pressure in its servo hydraulic pressure chamber is released to decrease the tension of the V-belt so that the side force on the driven pulley is utilized to move its movable conical member against the tension of the V-belt for thereby increasing the effective diameter of the driven pulley. In this mode of operation, the side force on the drive pulley may unnecessarily be reduced.

U.S. Pat. No. 3,600,961 issued Aug. 24, 1971 discloses a control structure utilizing higher-pressure oil of a constant pressure and regulated lower-pressure oil which can be regulated by a speed ratio or the like, the lower-force being applied to impose a side pressure on drive and driven pulleys. When the speed ratio is to be changed, the higher-pressure oil is selectively supplied to a servo hydraulic pressure chamber associated with one pulley the effective diameter of which is to become larger. The disclosed arrangement is also disadvantageous in that the load on a V-belt is increased to the extent which affects the durability thereof. In some speed ratio range, a higher side force than the necessary side force has to be applied, resulting in that an unnecessarily higher oil pressure is required.

The two Japanese Laid-Open Patent Publications, referred to above, may be also disadvantageous in that when the servo hydraulic pressure chamber of the drive pulley is connected to a drain passage to lower the pressure in the changer to thereby increase the speed ratio, most of the oil is drained from the servo hydraulic pressure chamber and air is allowed to enter the servo hydraulic pressure chamber, whereupon the drive pulley fails to apply the desired side force on the belt. Moreover, when regulated oil pressure is again introduced into the servo hydraulic pressure chamber, air remaining therein is compressed before the speed ratio starts to be changed. As a result, the transmission may not operate with a good response, when the speed ratio thereof is to be again decreased.

Japanese Laid-Open Patent Publication No. 60-159456 published Aug. 20, 1985 discloses the aforementioned type of belt-and-pulley type continuously variable transmission having drive and driven pulleys associated with servo hydraulic pressure chambers which have effective areas, respectively, different from each other, the hydraulic pressure chamber of the driven pulley being supplied with regulated oil pressure at all times. When the hydraulic pressure in the hydraulic pressure chamber of the drive pulley is low, low-pressure oil is supplied thereinto to prevent oil from being drained. Therefore, the disclosed transmission is free from one of the drawbacks as described just above. However, the transmission shown in this publication suffers from the following shortcomings:

1. Where the transmission is employed in a motor vehicle, mutually related signal oil pressures representing the opening of the throttle valve and the rotational speed of the engine are applied onto the opposite ends of a slide valve, and the stationary port of a servo hydraulic pressure chamber is connected selectively to an oil pressure passage and an oil drain passage for varying the speed ratio. In such an arrangement, however, there are a speed range in which an upshift and/or downshift cannot be performed resulting in that the speed ratio cannot freely be controlled in some speed ranges.
2. The speed at which the speed ratio varies tends to be constant at all times.

The above problems 1 and 2 can be solved by a belt-and-pulley type continuously variable transmission disclosed in Japanese Laid-Open Patent Publication No. 60-136655 published July 20, 1985. In this disclosed transmission, a regulated oil pressure is supplied to the hydraulic pressure chamber of a drive pulley through a directional control valve and a speed control valve which are disposed hydraulically in series with each other and controlled by solenoid-operated valves, respectively. The directional control valve disposed upstream of the speed control valve serves to change the direction in which the speed ratio varies, and the downstream speed control valve serves to control a speed at which the speed ratio varies. According to the disclosed transmission, the effective area of the movable conical member of a driven pulley is smaller than that of the movable conical member of the drive pulley, and the hydraulic pressure chamber of the driven pulley is supplied with the regulated oil pressure at all times. Therefore, the first mentioned problem that the load acting on the V-belt increases when varying the speed ratio cannot be solved by this transmission.

The present invention has been made in order to effectively solve the problems of the aforementioned transmissions for use in motor vehicles.

SUMMARY OF THE INVENTION

It is an object of the present invention to provide a belt-and-pulley type continuously variable transmission which is simple in structure, can keep side forces of drive and driven pulleys at suitable levels corresponding to a torque to be transmitted, can freely control a speed ratio in all speed ranges, and can control, to a certain extent, the speed at which the speed ratio varies.

To achieve the above object, there is provided in accordance with the present invention a method of controlling a belt-and-pulley continuously variable transmission having an input shaft, a driver pulley mounted on the input shaft and comprising a fixed conical member and a movable conical member, an output shaft, a driven pulley mounted on the output shaft and comprising a fixed conical member and a movable conical member, a V-belt trained around the driver and driven pulleys, first and second hydraulic pressure chambers for axially moving the movable conical members to vary effective diameters of the driver and driven pulleys for controlling a transmission ratio, and an oil pressure source and an oil drain unit operatively coupled to the first and second hydraulic pressure chambers, the movable conical members of the driver and driven pulleys being movable in synchronism with each other, the method comprising the steps of first communicating the hydraulic pressure chamber of one of the driver and driven pulleys which is to increase the effective diameter thereof at a time, with the oil pressure source, and then communicating the hydraulic pressure chamber of the other of the driver and driven pulleys which is to reduce the effective diameter thereof at the time, with the oil drain unit, for thereby starting to move the movable conical members.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is an enlarged fragmentary cross-sectional view of the transmission shown in FIG. 2;

DETAILED DESCRIPTION OF THE PREFERRED EMBODIMENTS

Figure 1:
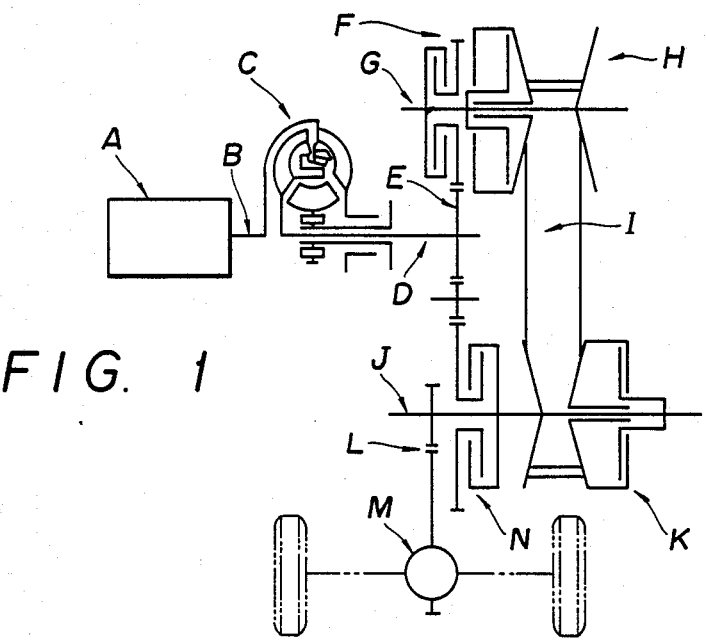
FIG. 1 is a schematic view of a power transmission system for a motor vehicle, including a belt-and-pulley type continuously variable transmission according to a preferred embodiment of the present invention.
Figure 2:
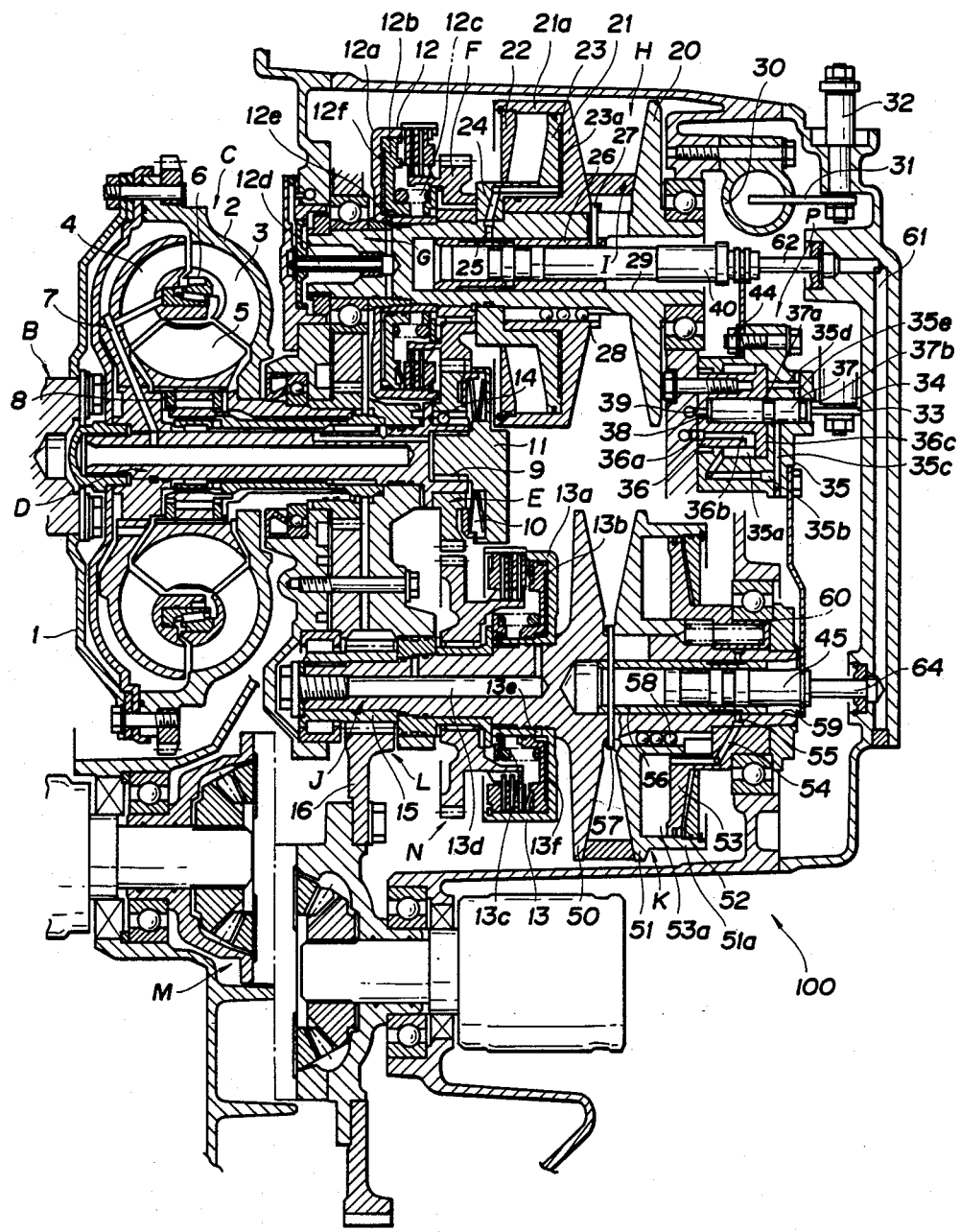
FIG. 2 is a cross-sectional view of the transmission shown in FIG. 1.

FIGS. 1 and 2 show a belt-and-pulley type continuously variable transmission, generally designated by the reference numeral 100, according to a preferred embodiment of the present invention, the transmission 100 being shown as being mounted in a motor vehicle such as an automobile.

As shown in FIG. 1, the output torque from an engine A is transmitted from an engine output shaft B via a torque converter C and its output shaft D to the transmission 100. The transmission 100 has an input gear E held in mesh with a gear F which can selectively be connected to an input shaft G by a forward clutch 12 (described later). When the clutch 12 is engaged, the torque is transmitted to a drive pulley H and then through an endless V-belt I to a driven pulley K on an output shaft J. The torque is thereafter transmitted from the output shaft J to a pair of drive road wheels W through a speed reducer mechanism L and a differential mechanism M.

The input gear E is held in mesh with an idler gear at all times which in turn meshes with a reverse gear N that can selectively be connected to the output shaft J by a reverse clutch 13 (described later). When the motor vehicle is to move in a reverse direction, the forward clutch 12 is disengaged and the reverse clutch 13 is engaged to reverse the drive road wheels W.

As illustrated in FIG. 2, the engine output shaft B is coupled to a torque converter cover 1 for rotating a support member 2 in unison which is coupled to the torque converter cover 1, the support member 2 supporting a pump impeller 3. A turbine impeller 4 is firmly coupled to the output shaft D of the torque converter C. The torque transmitted by the torque converter C is applied to the transmission 100 via the input gear E thereof which rotates with the output shaft D. The torque converter C has a stator 5 supported on the output shaft D by a one-way clutch 8, and a lockup clutch 6. The output shaft D has an axial recess 9 defined in its rear end and in which there is fitted by a bearing a cover 11 of a torque detector mechanism 10 that generates a transmitted torque signal for regulating a pressure of working oil.

The input gear E is always in mesh with a gear F rotatably supported on the input shaft G of the transmission 100. Rotation of the gear F is transmitted to the input shaft G when the forward clutch 12 is engaged. The forward clutch 12 comprises a multiple-plate clutch having a clutch housing 12a fixed to the input shaft G and a piston 12b defining a hydraulic pressure chamber 12f in the clutch housing 12a. Pressurized oil supplied from an oil passage 12d and a port 12e axially moves the piston 12b (to the right in FIG. 2) to press friction plates in the clutch housing 12a against friction plates mounted on the gear F, so that the torque from the gear F can be transmitted via the clutch housing 12a to the input shaft G. The friction plates on the gear F and the friction plates in the clutch housing 12a are alternately disposed, and are normally urged by a clutch spring 12c in a direction to disengage the clutch 12.

The drive pulley H is mounted on the input shaft G for rotation therewith. The drive pulley H comprises a stationary conical member 20 integrally formed with the input shaft G and a movable conical member 21 supported axially slidably, but nonrotatably, on the input shaft G. The endless V-belt I is trained around the drive pulley H and the driven pulley K on the output shaft J.

The movable conical member 21 has a cylinder wall 21a which cooperates with a partition 23 fixed to the input shaft G in defining a hydraulic pressure chamber 23a, the partition 23 having an oil passage 24 defined therein for supplying pressurized oil into and discharging the same from the hydraulic pressure chamber 23a. A cylinder cover 22 is attached to an end of the cylinder wall 21a. The input shaft G has a cylindrical bore 29 extending axially therethrough over a range in which the movable conical member 21 is slidable. In the bore 29, there are fitted slide valves 26, 40 for controlling the supply of pressurized oil into and the discharge of the same from the hydraulic pressure chamber 23a, and an oil pressure supply pipe 62. The movable conical member 21 can be axially moved smoothly by a ball bearing 28.

The speed reducer mechanism L includes a smaller-diameter gear 15 fixedly mounted on the output shaft J and held in mesh with a larger-diameter gear 16 of the differential mechanism M for transmitting the torque from the output shaft J to the differential mechanism M. The reverse gear N rotatably supported on the output shaft J is held in mesh with the input gear E at all times through the idler gear (not shown in FIG. 2). Rotation of the reverse gear N is selectively transmitted to the output shaft J by the reverse clutch 13. The reverse clutch 13 comprises a multiple-plate clutch having a clutch housing 13a mounted on the output shaft J, a piston 13b, a clutch spring 13c, and a hydraulic pressure chamber 13f. Pressurized oil can be supplied into the hydraulic pressure chamber 13f through an oil passage 13d defined axially in the output shaft J and a port 13e defined in the clutch housing 13a.

The driven pulley K is corotatably mounted on the output shaft J. The driven pulley K comprises a stationary conical member 50 integrally formed with the output shaft J and a movable conical member 51 supported axially slidably, but nonrotatably, on the output shaft J. The movable conical member 51 has an integral cylinder wall 51a having an end to which a cylinder cover 52 is attached. The cylinder wall 51a cooperates with a partition 53 fixed to the output shaft J in defining a hydraulic pressure chamber 53a. Several springs 60 are disposed between the partition 53 and the movable conical member 51. The movable conical member 51 can be axially moved smoothly by a ball bearing 58.

The output shaft J has a cylindrical bore 59 extending axially therethrough over a range in which the movable conical member 51 is slidable. An oil pressure supply pipe 64 and slide valves 56, 45 are fitted in the bore 59. Pressurized oil from the slide valves 45, 56 is supplied into the hydraulic pressure chamber 53a through a port 55 and an oil passage 54 defined in the passage 53.

The movable conical members 21, 51 are disposed on one side and the other side of the belt I, respectively.

A structure for controlling the effective diamter of the drive and driven pulleys H, K in response to a speed ratio varying signal based on the opening of a throttle valve and the pressure from a governor will be described below with reference to FIGS. 2 and 3.

Denoted at P is a servomechanism for producing a mechanical displacement serving as a component of the speed ratio varying signal. The servomechanism P comprises a servo piston 36 fixed to a transmission casing, a servo cylinder 35 slidably fitted over the servo piston 36, and a pilot valve 37 axially slidably disposed in bores coaxially defined in the piston 36 and the cylinder 35. The axial displacement of the pilot valve 37, i.e., the displacement of the servo cylinder 35 serves as the the component of speed ratio varying signal, as described later on.

The servo cylinder 35 and the piston 36 jointly define a hydraulic pressure chamber 36c therebetween. The servo cylinder 35 axially slides on the stationary piston 36 by a distance corresponding to the distance by which the pilot valve 37 moves. A connecting member 42 for moving the slide valve 40 of the drive pulley H is fixed to the servo cylinder 35 by means of a bolt 44, and a connecting member 47 for moving the slide valve 45 of the driven pulley K is fixed to the servo cylinder 35 by means of a bolt 49. The connecting members 42, 47 are connected to the slide valves 40, 45 at portions 41a and 46, respectively. More specifically, the slide valve 40 has an internally threaded portion at its righthand end in which a cylindrical connecting member 41 is threaded, the cylindrical connecting member 41 having the portion 41a. The slide valve 40 and the connecting member 41 are fixed to each other by a nut 41b after their relative position has been adjusted. The slide valve has the portion 46. The slide valve 40 of the drive pulley H and the slide valve 45 of the driven pulley K are therefore axially movable integrally with the servo cylinder 35 of the servomechanism P.

The slide valves 26, 40, and 56, 45 fitted respectively in the axial bores 29, 59 of the input and output shafts G, J will now be described below.

The slide valves 26, 56, and 40, 45 comprise first slide valves 26, 56 coupled to respective pins 27, 57 axially slidable integrally with the movable conical members 21, 51, and second slide valves 40, 45 inserted in axial bores of the first slide valves 26, 56, respectively, and axially slidable integrally with the servo cylinder 35. The first slide valves 26, 56 have respective oil grooves 26a, 56a which are defined in outer peripheral surfaces thereof and are held in communication with oil ports 25, 55 leading to the hydraulic pressure chambers 23a, 53a at all times, and ports 26b, 56b which are defined radially inwardly of the oil grooves 26a, 56a and held in communication therewith.

The second slide valves 40, 45 have: respective oil grooves 40d, 45d which are supplied with pressurized oil from a regulated oil pressure passage 61 via oil supply pipes 62, 64 and ports 63, 65, respectively; ports 40c, 45c communicating with the oil grooves 40d, 45d, respectively, and oil supply grooves 40a, 45a. The grooves 40a, 45a can be brought into communication with the ports 26b, 56b of the first slide valves 26, 56, respectively, on axial sliding movement of the second slide valves 40, 45 for supplying the regulated oil pressure from the regulated oil pressure passage 61. The second slide valves 40, 45 also have an orifice 40e and a port 45e, respectively, and oil drain grooves 40b, 45b, respectively, which can be brought into communication with the ports 26b, 56b of the first slide valves 26, 56, respectively, on axial sliding movement of the second slide valves 40, 45 for connecting the hydraulic pressure chambers 23a, 53a to oil drain passages 43, 48, respectively, through the orifice 40e and the port 45e.

FIGS. 4A through 4E schematically illustrate the successive positional relationships between the ports 26b, 56b of the first slide valves 26, 56, the supply grooves 40a, 45a of the second slide valves 40, 45, and the drain grooves 40b, 45b of the second slide valves 40, 45.

Figures 4A, 4B, 4C:
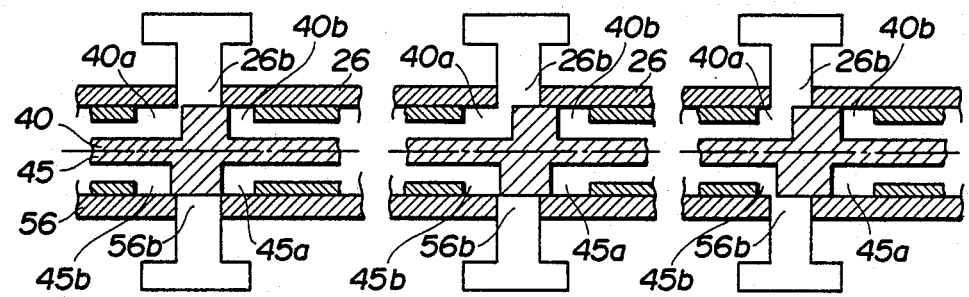
FIGS. 4A through 4E are fragmentary schematic cross-sectional views showing successive positional relationships of control valves of respective pulleys of the transmission.

FIGS. 4A through 4C show progressive movement to the right of the second slide valves 40, 45 from the position of FIG. 3 for a higher speed range in which the speed ratio between the drive and driven pulleys H, K is smaller. First, as shown in FIG. 4A, the oil supply groove 40a in the drive pulley H starts to communicate with the port 26b for supplying pressurized oil to the hydraulic pressure chamber 23a through the port 25 and the oil passage 24. However, at this time, the oil drain groove 45b in the driven pulley K is not yet in communication with the port 56b. Therefore, the effective diameter of the driven pulley K is not reduced, and the movable conical member 21 can not move to the right.

Then, when the second slide valves 40, 45 are continuously moved rightwardly to the position of FIG. 4B, the oil drain groove 45b starts communicating with the port 56b to release the oil in the hydraulic pressure chamber 53a. The movable conical members 21, 51 now start to move to the right.

When the second slide valves 40, 45 are further moved to the right and stopped at the position of FIG. 4C, working oil is continuously drained from the hydraulic pressure chamber 53a. The movable conical members 21, 51 are moved to the right until the oil drain groove 45b and the port 56b are brought out of communication with each other, whereupon the movable conical members 21, 51 are stopped at the position of FIG. 4D. At this time, the belt I is tensioned while the port 26b remains in communication with the oil supply groove 40a.

Figures 4D, 4E:
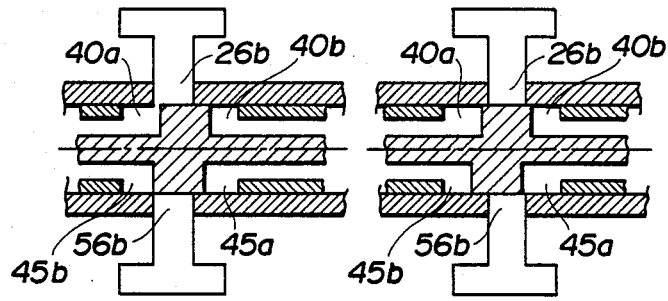

Movement to the left of the second slide valves 40, 45 from the position of FIG. 3 for a lower speed range in which the speed ratio between the drive and driven pulleys H, K is greater, will then be described below. First, as shown in FIG. 4E, the oil supply groove 45a starts communicating with the port 56b before the port 26b is brought into communication with the oil drain groove 40b. Thereafter, the regulated oil pressure is supplied to the hydraulic pressure chamber 53a and the oil pressure is drained from the hydraulic pressure chamber 23a in a manner which is a reversal of, or symmetric to, the process shown in FIGS. 4B through 4D. Therefore, the oil supply groove 45a first starts to communicate with the port 56b, and then the oil drain groove 40b starts to communicate with the port 26b, whereupon the movable conical members 21, 51 start to move to the left until finally they reach the positions corresponding to the positions of the second slide valves 40, 45.

Figure 5:
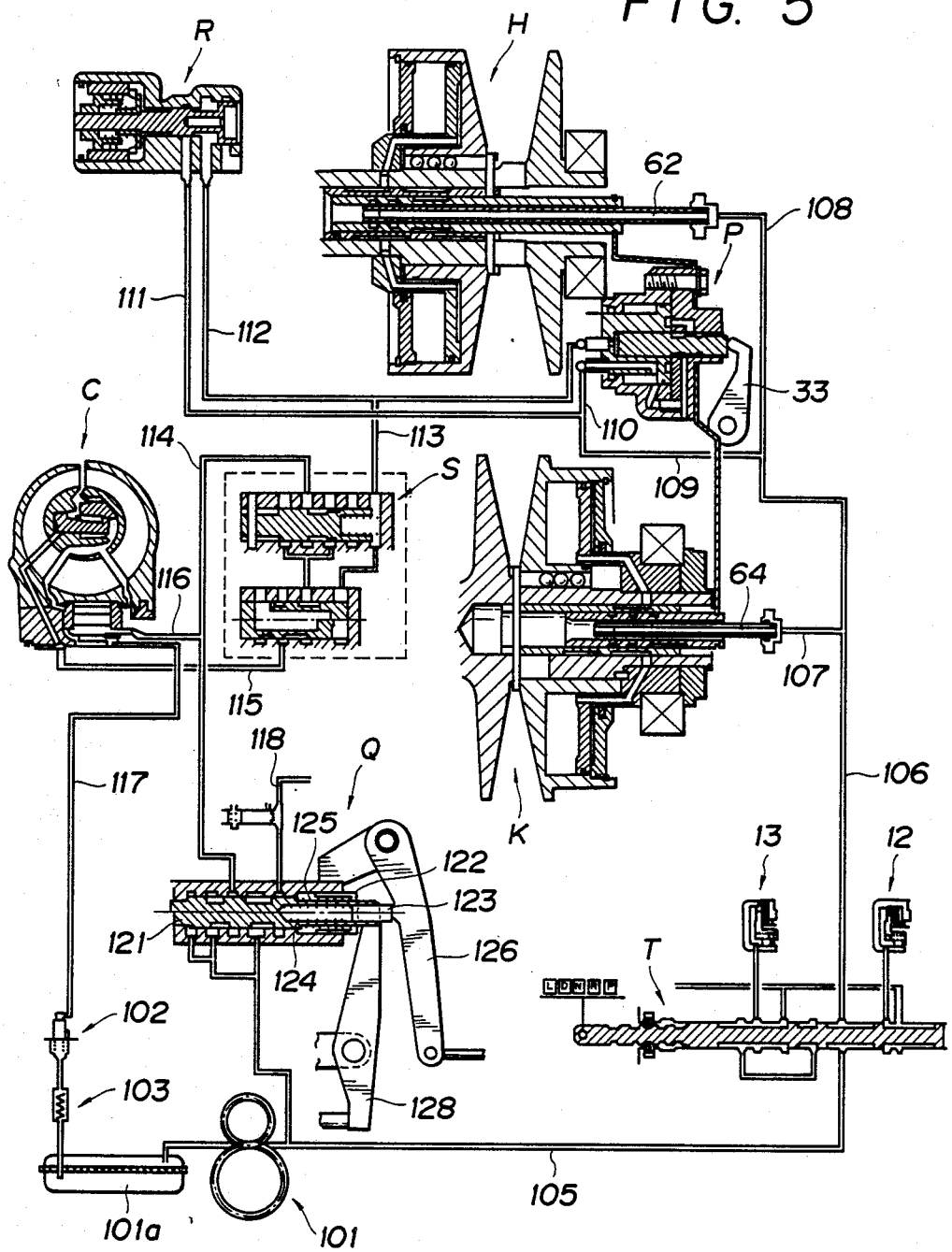
FIG. 5 is a circuit diagram of a hydraulic pressure circuit of the transmission.

FIG. 5 shows a hydraulic pressure circuit for controlling the speed ratio of the transmission 100.

The pressure of working oil supplied from an oil reservoir 101a by a pump 101 is regulated by a pressure regulating valve Q. When a manually operated valve T is operated to slide into an L position as shown, the regulated oil pressure is applied via an oil passage 105 and the manually operated valve T to the forward clutch 12 to operate the same. As a result, the output torque of the torque converter C is transmitted to the input shaft G for thereby rotating the drive pulley H.

The pressure regulating valve Q regulates the pressure of working oil in order to produce an optimum side force on the belt dependent on the torque transmitted by the transmission 100. The pressure regulating valve Q includes a slide valve 121 for controlling the amount of oil to be drained into an oil drain passage 118. The slide valve 121 of the pressure regulating valve Q is normally urged to the left by a spring 124 and an insert 123 held against a lever 126 coupled to the servo cylinder 35 by means of a rod 127. The lever 126 operatively coupled to the servo cylinder 35 is movable in response to the speed ratio of the transmission 100. The slide valve 121 is also urged to the left by a spring 125 and an insert 122 held against one end of a lever 128 which is movable in response to the input torque applied to the transmission 100. Therefore, the pressure of working oil is regulated by the pressure regulating valve Q to such a pressure that is proportional to the input torque and the speed ratio.

Figure 6:
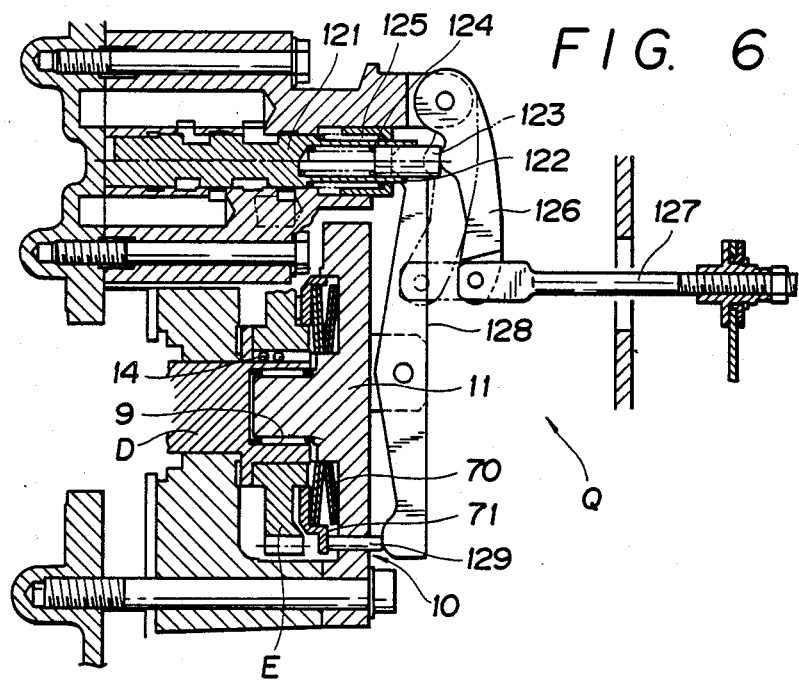
FIG. 6 is an enlarged cross-sectional view of a pressure regulating valve of the transmission.

As illustrated in FIG. 6 in detail, the lever 128 is angularly moved in proportion to the input torque by the torque detecting mechanism 10. The input gear E is constructed as a helical gear axially movably supported on an end of the output shaft D of the torque converter C by means of a bearing 14. The gear E is displaced to the right in FIG. 6 by a thrust force commensurate with the input torque. Such a displacement of the gear E is transmitted to the other end of the lever 128 by a member 71 and a pin 129. A needle bearing is disposed between the gear E and the member 71, which is normally urged toward the gear E by means of a spring 70.

The pressure regulating valve Q is not limited to the illustrated structure, but may be of any structure insofar as it can generate an oil pressure dependent on the input torque transmitted to the transmission 100. For example, the pressure regulating valve may comprise a solenoid-operated valve for regulating the pressure of working oil in response to an electric torque signal produced by a known torque sensor or the like, or in response to an engine speed signal and a speed ratio signal.

Referring back to FIG. 5, the regulated oil pressure is applied to the oil pressure supply pipe 64 of the driven pulley K through oil passages 106, 107 and also to the oil pressure supply pipe 62 of the drive pulley H through an oil passage 108, and at the same time the regulated oil pressure operates the forward clutch 12. The regulated oil pressure is also delivered into a branch passage 109 from which it is applied via an oil passage 110 to an oil pressure port 36a of the servomechanism P and also via an oil passage 111 to a governor valve R. The governor valve R comprises a valve for controlling an oil pressure by means of centrifugal forces, and is driven by the output shaft J for generating a governor oil pressure proportional to the vehicle speed. The governor oil pressure is introduced into an oil chamber 38 defined in an end of the pilot valve 37 of the servomechanism P, via an oil passage 112 and a port 39. The governor oil pressure is thus applied to the servomechanism P as a vehicle speed signal for speed ratio control.

The governor oil pressure is also supplied as a signal pressure via a branch passage 113 to a control valve S which controls the lockup clutch 6 of the torque converter C. An oil passage 114 extending from the pressure regulating valve Q supplies the regulated oil pressure to the torque converter C via a branch passage 116, and also supplies the regulated oil pressure to a hydraulic pressure chamber of the lockup clutch 6 through an oil passage 115 via the control valve S. The torque converter C has a return oil passage 117 with a check valve 102 and an oil cooler 103 therein.

As described above, the oil chamber 38 in the end of the pilot valve 37 of the servomechanism P is supplied with the vehicle speed signal, i.e., the governor oil pressure. The other end of the pilot valve 37 is urged by a lever 33 under a force proportional to the opening degree of the engine throttle valve. A mechanism for detecting the opening degree of the engine throttle valve is fitted in a cylindrical support member 30 attached to the transmission casing.

When the forward clutch 12 is operated by the manually operated lever T, the torque from the torque converter C is transmitted to the drive pulley H, the drive pulley K, and the output shaft J for thereby starting the motor vehicle. In FIG. 3, the effective diameter of the drive pulley H is shown as minimum, the effective diameter of the driven pulley K is shown as maximum, and hence the speed ratio is maximum (low speed range).

As the vehicle speed increases, the governor oil pressure applied to the oil chamber 38 in the end of the pilot valve 37 rises to move the pilot valve 37 to the right in FIG. 3. An oil pressure supply groove 37a in the pilot valve 37 is now connected to an oil passage 35c in the servo cylinder 35, whereupon the regulated oil pressure supplied to the oil pressure port 36a is supplied to the hydraulic pressure chamber 36c via an oil passage 36b defined in the stationary piston 36, a hydraulic pressure chamber 35a defined in the servo cylinder 35, an oil passage 35b defined in the servo cylinder 35, the oil passage 35c, and the oil pressure supply groove 37a. As a result, the servo cylinder 35 is moved to the right. When the vehicle speed stops increasing, the pilot valve 37 is stopped in position, and so is the servo cylinder 35 in a position corresponding to the pilot valve 37. When the vehicle speed continues to increase, thus moving the pilot valve 37 further to the right, the aforesaid port 36a, passage 36b, chamber 35a, and oil passages 35b, 35c remain in communication with the oil pressure supply groove 37a, so that the servo cylinder 35 keeps on moving to the right. Therefore, the servomechanism P has its servo cylinder 35 movable by following the pilot valve 37. The rightward movement of the servo cylinder 35 is transmitted by the connecting members 42, 47 to the second slide valves 40, 45 of the drive and driven pulleys H, K, respectively, to move the second slide valves 40, 45 to the right.

When the accelerator pedal is depressed to increase the opening degree of the throttle valve while the motor vehicle is running at a constant speed, the pilot valve 37 is moved to the left in FIG. 3 by the lever 33. Therefore, an oil drain groove 37b in the pilot valve 37, which communicates with an oil drain port 37c, is connected to a port 35e in the servo cylinder 35, and the oil pressure supply groove 37a is disconnected from the oil passage 35c, whereupon pressurized oil is drained from the hydraulic pressure chamber 36c through an oil passage 35d and the port 35e into the oil drain port 37c. The servo cylinder 35 is now moved to the left by a pressure buildup in the hydraulic pressure chamber 35a. The leftward movement of the servo cylinder 35 is transmitted by the connecting members 42, 47 to the second slide valves 40, 45 of the drive and driven pulleys H, K, respectively, to move the second slide valves 40, 45 to the left.

Operation of the slide valves 26, 40 and 56, 45 of the pulleys H, K shown in FIG. 3 will be described below.

When the servo cylinder 35 is moved to the right by an increase in the vehicle speed, the second slide valves 40, 45 of the drive and driven pulleys H, K are also moved to the right integrally with the servo cylinder 35. As described with reference to FIGS. 4A through 4E, the oil supply groove 40a of the second slide valve 40 of the drive pulley H first communicates with the port 26b of the first slide valve 26, for thereby supplying the regulated oil pressure into the hydraulic pressure chamber 23a of the drive pulley H. Immediately thereafter, the oil drain groove 45b, which communicates with the oil drain passage 48, of the second slide valve 45 of the driven pulley K communicates with the port 56b of the first slide valve 56, starting to drain pressurized oil from the hydraulic pressure chamber 53a. Therefore, the movable conical members 21, 51 now start to slide to the right.

Since the first slide valves 26, 56 move to the right integrally with the movable conical members 21, 51, respectively, the grooves and ports referred to above remain communicating with each other as long as the second slide valves 40, 45 continue to move. After the servo cylinder 35 is stopped due to a change in the throttle valve opening signal and/or the vehicle speed signal, the first slide valves 26, 56 slide to the right thereby to bring the grooves and ports out of communication, whereupon the rightward movement of the movable conical members 21, 51 is interrupted. The rightward movement of the movable conical members 21, 51 increases the effective diameter of the drive pulley H, and reduces the effective diameter of the driven pulley K, so that the speed ratio is lowered (higher speed range).

When the opening degree of the throttle valve is increased while the speed ratio is being minimum (high speed range), the pilot valve 37 is moved to the left, and so are the second slide valve 40 of the drive pulley H and the second slide valve 45 of the driven pulley K. As described above with reference to FIGS. 4A through 4E, the oil supply groove 45a of the second slide valve 45 of the driven pulley K first communicates with the port 56b of the first slide valve 56 to supply the regulated oil pressure into the hydraulic pressure chamber 53a in the driven pulley K. Immediately thereafter, the oil drain groove 40b of the second slide valve 40 of the drive pulley H communicates with the port 26b of the first slide valve 26 to start to drain the pressurized oil from the hydraulic pressure chamber 23a. As the oil starts being drained, the movable conical members 21, 51 also start to slide to the left. Since the first slide valves 26, 56 moves to the left integrally with the movable conical members 21, 51, the grooves and ports referred to above remain communicating with each other as long as the second slide valves 40, 45 continue to move. After the servo cylinder 35 is stopped by the throttle valve opening signal and/or the vehicle speed signal, the first slide valves 26, 56 slide to the left thereby to bring the grooves and ports out of communication, whereupon the leftward movement of the movable conical members 21, 51 is interrupted. The leftward movement of the movable conical members 21, 51 increases the effective diameter of the driven pulley K, and reduces the effective diameter of the drive pulley H, so that the speed ratio is increased (lower speed range).

As described above, the movable conical members 21, 51 are movable by following the axial movement of the second slide valves 40, 45. In the drive pulley H, the slide valves 26, 40 jointly serve as a servomechanism with the second slide valve 40 functioning as a pilot valve of the servomechanism. Likewise, in the driven pulley K, the slide valves 56, 45 jointly serve as a servomechanism with the second slide valve 45 functioning as a pilot valve of the servomechanism.

As described above with reference to FIGS. 4A through 4E, the oil pressure is first supplied to the hydraulic pressure chamber of one pulley, the effective diameter of which is to become larger at the time, and immediately thereafter the working oil is drained from the hydraulic pressure chamber of the other pulley, the effective diameter of which is to become smaller. More specifically, when conditions for draining the oil from the hydraulic pressure chamber of the other pulley are established, conditions for supplying the regulated oil pressure to the one pulley have already been established. Therefore, the speed ratio can continuously be varied while maintaining the tension on the V-belt I at a suitable level. It would be more effective to restrict the oil drain groove 40b, the orifice 40e, the oil drain groove 45b, and the port 45e into smaller cross-sectional areas than those of the port 40c, the oil supply groove 40a, the port 45c, and the oil supply groove 45a.

In the belt-and-pulley type continuously variable transmission 100, the movable conical members 21, 51 of the drive and driven pulleys H, K are axially slidable substantially in unison with each other in synchronism with each other by the servomechanism P which produces a signal for varying the speed ratio and the slide valves 40, 26 and 45, 56 coacting with the servomechanism P. Consequently, no unnecessary side force is imposed on the V-belt I at either pulley, with the result that the effective diameters of the drive and driven pulleys can be increased and reduced while always maintaining the side force corresponding to the torque being transmitted.

Inasmuch as the servomechanism P which has its servo cylinder 35 movable by following the pilot valve 37 is employed as a mechanism for producing a signal for varying the speed ratio, it can easily obtain an output of displacement which is equal to an axial displacement by which the movable conical members 21, 51 are required to slide, and can produce a large operating force with a relatively small signal pressure or energy level.

Moreover, in the transmission 100, the movable conical members 21, 51 are movable by following the second slide valves 40, 45 serving as pilot valves. Therefore, when the oil is drained from the hydraulic pressure chamber 23a of the drive pulley H or the hydraulic pressure chamber 53a of the driven pulley K, the oil is drained from the chamber 23a or 53a by the amount which corresponds to the axial displacement of the movable conical member 21 or 51. Accordingly, an unnecessary drop of the regulated oil pressure is prevented to thereby prevent the side force on the belt from being excessively reduced, and no air enters the hydraulic pressure chambers 23a, 53a. As a consequence, the movable conical member 21 or 51 can start sliding with good response when the speed ratio is to be varied again. The speed ratio can be increased or reduced no matter where the second slide valves 40, 45 shifted by predetermined signals may be positioned. Stated otherwise, the transmission 100 has no speed range in which an upshift and a downshift would be impossible to effect. These advantages can be provided by simple valve structures. By appropriately setting the effective areas of the ports 26b, 25, the orifice 45e, the ports 56b, 55, the oil drain groove 45b, and the like, the movable conical member 21, 51 of the drive and driven pulleys H, K are allowed to slide at a speed according to the speed at which the second slide valves 40, 45 slide. Thus, the speed at which the speed ratio varies can variably be controlled.

The oil pressure applied to the servo cylinder 35 of the servomechanism P may be higher than the oil pressure applied to impress a side force on the pulleys, and the movable conical members 21, 51 may be moved mechanically by the servo cylinder 35.

The second slide valves 40, 45 may be actuated by a linear solenoid-operated valve that is slidable based on an electric signal, rather than by the pilot valve 37 which is slidable by a hydraulic pressure signal.

The movable conical members of the drive and driven pulleys may be mechanically coupled to each other so that they are slidable integrally with each other. In this case, the regulated oil pressure may be supplied to and drained from the hydraulic pressure chambers of the movable conical members by solenoid-operated valves, such that the oil pressure is first supplied into the hydraulic pressure chamber of other pulley, the effective diameter of which is to become smaller, and then the oil is drained from the hydraulic pressure chamber of the pulley which is to reduce its effective diameter.

Moreover, also the hydraulic pressure chamber of the other pulley may be connected to the oil pressure supply port for preventing a pressure drop in the hydraulic pressure chamber, which otherwise might occur due to oil leakage via a seal of the hydraulic pressure chamber.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A method for controlling a speed ratio of a belt-and-pulley type continuously variable transmission having an input shaft, a drive pulley mounted on said input shaft and comprising a stationary conical member and a movable conical member, an output shaft, a driven pulley mounted on said output shaft and comprising a stationary conical member and a movable conical member, a V-belt trained around said drive and driven pulleys, first and second hydraulic pressure chambers for axially moving said movable conical members to vary effective diameters of said drive and drive pulleys for thereby controlling a speed ratio, and an oil pressure source and an oil reservoir operatively coupled to said first and second hydraulic pressure chambers, said method comprising the steps of:

maintaining oil pressure within said hydraulic pressure chambers of said drive and driven pulleys at a predetermined oil pressure, while said speed ratio is maintained at a constant valve;

communicating the hydraulic pressure chamber of one of said drive and driven pulleys, the effective diameter of which is to become larger at that time, with said oil pressure source to thereby supply larger oil pressure than said predetermined oil pressure into said hydraulic pressure chamber of said one of said drive and driven pulleys; and releasing the hydraulic pressure chamber of the other of said drive and driven pulleys, the effective diameter of which is to become smaller at the time, to said reservoir no earlier than said communication of the hydraulic pressure chamber of said one of said pulleys to said oil pressure source, for thereby starting to move said movable conical members of said drive and driven pulleys in synchronism with each other.

2. A method for controlling a speed ratio of a belt-and-pulley type continuously variable transmission having an input shaft, a drive pulley mounted on said input shaft and comprising a stationary conical member and a movable conical member, an output shaft, a driven pulley mounted on said output shaft and comprising a stationary conical member and a movable conical member, a V-belt trained around said drive and driven pulleys, first and second hydraulic pressure chambers for axially moving said movable conical members to vary effective diameters of said drive and driven pulleys for thereby controlling a speed ratio, and an oil pressure source and an oil reservoir operatively coupled to said first and second hydraulic pressure chamber, said method comprising the steps of:

first communicating the hydraulic pressure chamber of one of said drive and driven pulleys, the effective diameter of which is to increase at a time, with said oil pressure source; and then communicating the hydraulic pressure chamber of the other of said drive and driven pulleys, the effective diameter of which is to reduce at the time, with said oil reservoir, for thereby starting to move said movable conical members of said drive and driven pulleys in synchronism with each other;

wherein the method includes the step of bringing said oil pressure source and the hydraulic pressure chamber of said one pulley, and said oil reservoir and the hydraulic pressure chamber of said pulley into communication with each other by first and second valves, respectively, actuatable in unison by a speed ratio varying signal generating mechanism and having oil supply grooves, respectively, and oil drain grooves, respectively, which are offset with respect to each other.

3. A belt-and-pulley type continuously variable transmission comprising:

an input shaft;

a drive pulley mounted on said input shaft and comprising a stationary conical member and a movable conical member;

an output shaft;

a driven pulley mounted on said output shaft and comprising a stationary conical member and a movable conical member;

a V-belt trained around said drive and driven pulleys;

first and second hydraulic pressure chambers for axially moving said movable conical members to vary effective diameters of said drive and driven pulleys for controlling a speed ratio;

an oil pressure source and an oil reservoir operatively coupled to said first and second hydraulic pressure chambers;

a first opening communicating with said first hydraulic pressure chamber;

a first slide valve having a first oil supply groove communicating with said oil pressure source and a first oil drain groove communicating with said oil reservoir, and actuatable for communicating said first opening selectively with said first oil supply groove and said first oil drain groove;

a second opening communicating with said second hydraulic pressure chamber;

a second slide valve having a second oil supply groove communicating with said oil pressure source and a second oil drain groove communicating with said oil, reservoir and actuatable for communicating said second opening selectively with said second oil supply groove and said second oil drain groove; and a first mechanism responsive to a speed ratio varying signal for axially sliding said first and second slide valves in synchronism with each other, such that the hydraulic pressure chamber of one of said drive and driven pulleys, the effective diameter of which is to become larger at a time, is communicated with the oil supply groove of an associated one of said slide valves, and the hydraulic pressure chamber of the other of said drive and driven pulleys, the effective diameter of which is to become smaller at the time, is communicated with the oil drain groove of the associated other of said slide valves no earlier than said communication of the hydraulic pressure chamber of said one pulley to said oil supply groove of said associated slide valve, for thereby starting to move said movable conical members of said drive and driven pulleys move in synchronism with each other.

4. A belt-and-pulley type continuously variable transmission according to claim 3, wherein said input shaft has a first axial hollow space defined therein and said output shaft has a second axial hollow space defined therein, said transmission further including:

a first hollow cylindrical member slidably fitted in said first axial hollow space and fixedly coupled to said movable conical member of the drive pulley, said first hollow cylindrical member having defined therein said first opening in communicating with said first hydraulic pressure chamber;

a second hollow cylindrical member slidably fitted in said second axial hollow space and fixedly coupled to said movable conical member of the driven pulley, said second hollow cylindrical member having defined therein said second opening in communication with said second hydraulic pressure chamber;

said first and second slide valves being fitted in said first and second hollow cylindrical members, respectively; and said first hollow cylindrical member being axially movable in unison with an axial sliding movement of said first slide valve, and said second hollow cylindrical member being axially movable in unison with an axial sliding movement of said second slide valve.

5. A belt-and-pulley type continuously variable transmission according to claim 3, mounted on a motor vehicle, wherein said first mechanism comprises:

a servomechanism including a pilot valve urged in opposite directions by an urging force proportional to the pressure produced by a governor valve by the motor vehicle and an urging force proportional to an opening degree of a throttle valve of the motor vehicle; and said servomechanism having an output member movable in unison with the movement of said pilot valve and fixedly coupled to said first and second slide valves.

6. A belt-and-pulley type continuously variable transmission comprising: an input shaft; a drive pulley mounted on said input shaft and comprising a stationary conical member and movable conical member; an output shaft; a driven pulley mounted on said output shaft and comprising a stationary conical member and a movable conical member; a V-belt trained around said drive and driven pulleys; first and second hydraulic pressure chambers for axially moving said movable conical members, respectively, to vary effective diameters of said drive and driven pulleys for thereby controlling a speed ratio; an oil pressure source and an oil reservoir; a first slide valve movable in a first predetermined direction for selectively communicating said first hydraulic pressure chamber with one of said oil pressure source and said oil reservoir; and a second slide valve movable in a second predetermined direction for selectively communicating said second hydraulic pressure chamber with the other of said oil pressure source and said oil reservoir; wherein:

said transmission further comprising a servomechanism responsive to a speed ratio varying signal for sliding said first and second slide valves in synchronism with each other in said first and second predetermined directions, respectively, such that the hydraulic pressure chamber of one of said drive and driven pulleys, the effective diameter of which is to become larger at that time, is communicated with said oil pressure source, and the hydraulic pressure chamber of the other of said drive and driven pulleys, the effective diameter is to become smaller, is communicated with said oil reservoir no earlier than said communication of the hydraulic pressure chamber of said one pulley to said oil pressure source, for thereby starting to move said movable conical members of said drive and driven pulleys in synchronism with each other.

* * * * *

UNITED STATES PATENT AND TRADEMARK OFFICE
CERTIFICATE OF CORRECTION

PATENT NO. : 4,904,229

DATED : February 27, 1990

INVENTOR(S) : Torao Hattori

It is certified that error appears in the above-identified patent and that said Letters Patent is hereby corrected as shown below:

Column 1, line 36 before "pulley" change "driver" to --drive--.

Column 5, line 66 correct the spelling of "diameter".

Signed and Sealed this

Thirty-first Day of March, 1992

*Attest:*

HARRY F. MANBECK, JR.

*Attesting Officer*      *Commissioner of Patents and Trademarks*